United States Patent [19]

Lingart

[11] Patent Number: 5,536,345
[45] Date of Patent: Jul. 16, 1996

[54] PROCESS FOR MANUFACTURING NATURAL STONE-TYPE, PANEL-SHAPED CONSTRUCTION AND DECORATION MATERIALS

[75] Inventor: Jury Lingart, Prague, Czechoslovakia

[73] Assignee: Schott Glaswerke, Mainz, Germany

[21] Appl. No.: 260,690

[22] Filed: Jun. 14, 1994

[30]   Foreign Application Priority Data

Jun. 15, 1993  [DE]  Germany ................. 43 19 808.2

[51] Int. Cl.⁶ ..................... B32B 31/26; C04B 30/00
[52] U.S. Cl. ................. 156/89; 264/56; 264/60; 264/66
[58] Field of Search ..................... 428/428, 446; 52/612; 156/89; 264/241, 246, 250, 256, 346, 348, DIG. 57, 56, 60, 66

[56]   References Cited

FOREIGN PATENT DOCUMENTS

| | | |
|---|---|---|
| 1540546 | 9/1968 | France . |
| 62652 | 7/1968 | Germany . |
| 4125698 | 11/1992 | Germany . |
| 4123581 | 1/1993 | Germany . |
| 1444308 | 12/1988 | U.S.S.R. . |

*Primary Examiner*—David A. Simmons
*Assistant Examiner*—M. Curtis Mayes
*Attorney, Agent, or Firm*—Millen, White, Zelano & Branigan

[57]   ABSTRACT

The invention concerns a process for manufacturing natural stone-type panel-shaped construction and decoration materials of high strength for facing facades, walls and floors in indoor and outdoor areas, consisting of stacked individual layers of crushed glass, charge materials, in particular sand, and mixtures thereof.

26 Claims, No Drawings

PROCESS FOR MANUFACTURING NATURAL STONE-TYPE, PANEL-SHAPED CONSTRUCTION AND DECORATION MATERIALS

BACKGROUND OF THE INVENTION

The invention concerns a process for manufacturing natural stone-type, panel-shaped construction and decoration materials of high solidity for facing facades, walls and floors in indoor and outdoor areas, comprising stacked individual layers of crushed glass, charge material, in particular sand, and mixtures thereof.

A great variety of natural and synthetic materials are used for decorative applications in indoor and outdoor areas. Of the natural materials, in particular marble and granite find broad application and are used in large quantities for the interior and exterior facing of representative buildings. In addition to the decorative impression, corrosion resistance and economic production of the materials must also be ensured. Materials which occur naturally do not always meet these requirements, since sufficiently large surfaces of homogenous appearance can often not be obtained and since the corrosion resistance and solidity are not always optimal, due to the porosity of the natural material.

A glass ceramic material is thus known from DE 41 25 698 C1, having the following composition (in wt. % on oxide basis):

| | |
|---|---|
| $SiO_2$ | 64.1–72 |
| $Al_2O_3$ | 2.9–11 |
| CaO | 15.0–26 |
| MgO | 0–8 |
| ZnO | $0 \leq 2$ |
| BaO | 0–0.5 |
| $K_2O$ | 0–7.4 |
| $Na_2O$ | 0–2 |
| F | 0.5–4 | whereby $\Sigma\ Na_2O+K_2O$ is at least 2.

This material is used in the construction industry as a natural stone substitute for decorative applications, to cover floors and to face walls and facades.

Glass ceramic as a natural stone substitute offers a good decorative appearance, but is costly and difficult to produce, due to, e.g., the expensive ceramization process. In addition, relatively pure and thus valuable raw materials are needed to manufacture this material.

DE 41 23 581 A1 discloses a process for manufacturing form bodies, in particular construction panels, from glass granulates, wherein raw granular material is made from a mixture of crushed glass and a foaming agent and said raw granular material can be expanded under heat, whereby first, a layer of unexpanded raw granules and, thereabove, a layer of expanded foam glass granules are deposited in a mold in a hot or cold state as feed, the feed is then heated to 700° to 900° C., preferably 800° to 900° C.

and subsequently compressed under a pressure of 0.005 to $0.015 N/mm^2$ by 5 to 15%, whereby a form body of firm compound arrangement is created.

These construction panels manufactured by the process according to the DE 41 23 581 A1 are particularly suited for use as insulation panels in a thermal insulation compound system, whereby the raw granular material of which the panels are composed must first be manufactured with great expenditure of energy.

SUMMARY OF THE INVENTION

It is an object of the present invention to provide a process for manufacturing decorative, natural stonetype, weather-resistant panel-shaped construction materials, including large-dimensional ones, which are resistant to acidic and alkaline media, whereby it is possible to produce, economically and in an environmentally beneficial manner, without the need of the use of organic additives, facing panels for facades, walls and floors, which meet all construction law and official requirements and, in addition, fulfill aesthetic and modern design requirements while permitting flexible design, from inexpensive and readily available raw materials such as glass, used glass and, e.g., sand and other natural inorganic charge materials.

Furthermore, another object of the present invention is to select the manufacturing parameters in such a manner that the proposed method and a suitable temperature curve in the production of the construction materials ensure that the panels do not react with the production mold, no unevennesses occur on the panel surface, the panels are not subject to deformation, no bubbles, pores, occlusions and/or microcracks are formed in the top layer and there is no need for grinding or polishing of the final product.

Upon further study of the specification and appended claims, further objects and advantages of this invention will become apparent to those skilled in the art.

These objects are achieved according to the invention by process comprising:

1.1 optionally depositing a level, evenly thick layer of sand in at least one temperature-resistant mold;

1.2 deposition of a level, evenly thick layer of a mixture of crushed glass and sand on top of said layer of sand if the latter is present;

1.3 super-deposition of a further level layer of crushed glass;

1.4 whereby each individual layer is compressed and the entire resultant layer stack is compressed;

1.5 subsequently heating the layer stack in the at least one mold to a temperature of 600°–850° C. during a period of 20–100 min.;

1.6 tempering the heated layer stack at 600°–850° C. for a period of 6–35 min.;

1.7 subsequently further heating the layer stack to a temperature at which the surface of the glass displays a viscosity $\eta$ of $10^4$ to $10^{5.5}$ dPas and maintaining this temperature for 6–40 min., whereby the temperature application occurs unilaterally from above by a heat flow evenly distributed across the panel surface;

1.8 cooling the layer stack to a temperature of 600°–750° C. over a period of time sufficient to obtain an even temperature distribution through the volume of the layer stack; and 1.9 maintaining the temperature of 600°–750° C. for 15–65 min., followed by precise linear cooling to a temperature of 400°–500° C. at 2–5K/min. and, upon reaching this temperature, performing free or forced cooling to room temperature.

In accordance with the inventive process, a layer stack composed of the stacked individual layers compressed in the temperature-resistant molds is provided and then subjected to a thermal treatment procedure comprising several successive treatments:

Treatment 1.5:

In this treatment, the layer stack is heated from room temperature to an annealing or tempering temperature at a rate whereby the panels are not deformed and/or unevenness does not occur in the panel surface.

The layer stack is heated to a temperature of preferably about 600°–850° C. The respective temperature level depends on the chemical composition of the charge material and the type of glass granulate used for the surface layer. The time period for heating the layer stack from, for example, room temperature to a temperature of 600°–850° C. is preferably approximately 30 min. for panels having a volume of about 10–12 mm and preferably up to about 100 min. for panels having a volume of up to about 40 mm. For layer stack volumes from 13 mm upwards, the treating period for the panel in the individual process steps rises in accordance with the formula $t=0.08 \times D \times t_0$, wherein D is the volume of the panel (in mm) and $t_0$ is the heating period for a panel having a volume of 10 to 12 mm, i.e., about 30 minutes. Thus, for example, the heating period for a layer stack of 30 mm volume is preferably about: $t=0.08 \times 30 \times 30=72$ min.

The heating area, preferably consisting of one or two heating chambers, is preferably arranged so as to ensure that the distribution of the heat flow proceeds parabolically in relation to the longitudinal and the transverse axis of the panel. This facilitates compensation of the heat losses at the edges of the panel and thus provides for an even temperature of the whole panel surface with a tolerance of preferably about ±10K to ±12K. If the temperature differences on the panel surface are larger than ±12K, the panel becomes uneven, because the differences of the temperatures of the individual layers of the panel, particularly in the vicinity of the edges, become too great. This error cannot be corrected during subsequent thermal treatment. This concerns particularly the corners of the panel.

Treatment 1.6:

The layer stack is kept at this temperature. The dwell period is preferably about 6–35 min., depending on the volume of the panel. Typically, a layer stack having a volume of 10–12 mm is tempered for preferably about 10 min. The curve of the heat flow distribution should be similar to that specified for treatment 1.5, but the temperature differences on the panel surface now preferably do not exceed 3–5K. If the temperature differences are greater, the panel edges and the volume of the melted layer on the edges become uneven, so that parts of the edge must be cut off to meet quality requirements. Treatment 1.6 is very important for the production of a high-quality surface layer. In this treatment, the formation of a temperature gradient, e.g., about 50–70K in the direction of the panel volume (10–12 mm) must be ensured, so as to avoid caking of the bottom side of the panel with the mold during the next thermal treatment. The temperature during treatment 1.6 must be maintained for a period sufficient to achieve a stationary thermal state. The dwell period or thermal retardation period is determined by the thermophysical properties of the layer stack and the temperature-resistant mold. If the mold is made of a material with low heat capacity and high heat conductivity, the retardation period is relatively short, because the desired thermal equilibrium is achieved swiftly.

Treatment 1.7:

In this treatment, the layer stack is maintained at an annealing temperature for a sufficient time to achieve a viscosity of $10^{4.0}-10^5$ dPas.

The layer stack is further heated to up to a maximum process temperature. In this treatment, a "temperature shock" is being applied with the objective of vitrifying the surface of the stack, but not the whole stack. The maximum process temperature is applied to the entire surface of the panel very evenly, and maintained until a viscosity of preferably about $10^{4.5}-10^5$ dPas is achieved for the top layer. The treatment period is preferably about 6–40 min., in particular 12 min., for a layer stack of 10–12 mm volume.

The treatment period or retardation period must also be sufficiently long for the generation of a mirror-flush, even surface on the entire panel.

The temperature is applied unilaterally from above by a heat flow evenly distributed over the entire panel surface, preferably in a continuous furnace with continuous or phase operation.

The determination of the maximum process temperature for charges of differential composition is particularly important. If the temperature selected is too high, the viscosity gets too low and errors are generated on the surface of the panel due to excessive degassing of the lower material layers. If the temperature selected is too low, the optimal mechanical properties are not achieved. The same negative effect occurs if the maximum process temperature is applied for too short a period. The evenness of the temperature distribution on the entire panel surface during this process step also has a decisive impact on the reproducibility of the colors. The temperature differences on the surface preferably do not exceed ±8K. The maximum temperature depends on the composition of the charge and is typically, e.g., 840°–990° C. It is determined for the individual compositions on the basis of the homogeneity of the surface layer.

Treatment 1.8:

The layer stack is cooled to a temperature of preferably about 600°–750° C. during a time span sufficient to achieve an even temperature distribution through the entire volume of the stack, i.e., preferably a time period of about 6–35 min., particularly 10 min., for a layer stack having a volume of 10–12 mm. Preferably, the temperature is approximately equal to the temperature of treatment 1.6 or up to about 25° C. higher. Cooling is effected most simply by moving the mold through a passive zone, e.g., a chamber without a heating device of uneven lining, at a suitable speed. Here, uneven lining refers to insulation material having a thickness which varies along the direction of movement of the mold. The lining must thereby be formed in such a manner that the surface of the panel is evenly cooled. If this is not the case, residual stress and subsequent deformation of the panel result, which cannot be corrected by subsequent thermal treatment. The duration of the cooling period is determined, first of all, by the thermal capacity of the panel, the mold and the chamber, but also by the speed at which the mold is passed through this passive zone.

Treatment 1.9:

In this treatment, the layer stack is cooled from the maximum process temperature to room temperature at a rate whereby cracks and deformations in the layer stack are avoided.

To temper the panels free of stress, the temperature is equalized in the entire volume. A tempering time period of preferably about 15–65 min. is usually sufficient, in particular 20 min., for a layer stack having a volume of 10–12 mm. More than 90% of the residual stress is thereby removed during the first 5 min. The evenness of the temperature distribution should preferably be equal to that of treatment 1.6. It has been found that an unevenness of the temperature distribution on the order of ±10K results in visible unevenness of the panel. The optimal annealing temperature corresponds to a viscosity of preferably about $10^{13}$–$10^{13.5}$ dPas.

Subsequently, cooling continues. Until a temperature of about 400°–500° C. is achieved, the cooling speed is preferably about 2–5K/min., which results in a cooling period of about 40 min.–2 hours. The cooling speed is determined by the volume of the panel, the thermal capacity of the entire panel, the mold and the mold shell.

A higher cooling speed has a negative effect on the mechanical properties of the surface layer, resulting in cracks and deformations. A lower cooling speed has no effect on the quality of the panel. The following cooling speeds were found to be optimal: 3K/min. for panels with a volume of more than 15 mm and reinforced panels, and about 4–5K/min. for panels with a volume of 8–12 mm. If the cooling process is effected with a nonlinear temperature curve, micro-cracks form in the surface layer. Further cooling to room temperature takes about 3–3.5 hours and up to around 4.5 hours for very thick panels. It was found that, by using an active air cooling system or a cooled furnace roof, these periods can be reduced to about 1.5–2 hours, without any negative effect on panel quality. The performance of this step depends on the layout of the furnace and the organization of the operation. Panels have also been directly removed from the furnace at temperatures of 300°–350° C.

According to the invention, a glass granulate of sheet glass and/or blown glass, e.g., from bottles and containers, and mixtures thereof can be used as crushed glass, whereby used and recycled glass as well as glass residues can be included.

Preferably, the glass used has a composition within the following parameter ranges (in wt. % on oxide basis):

| | |
|---|---|
| $SiO_2$ | 60–80 |
| $Al_2O_3$ | 0–7 |
| $Na_2O$ | 2–17 |
| $K_2O$ | 0–7 |
| MgO | 0–4.5 |
| CaO | 0–10 |
| PbO | 0–20 |
| BaO | 0–13.5 |
| $B_2O_3$ | 0–15 |
| SrO | 0–1.5 |
| ZnO | 0–1 |
| $ZrO_2$ | 0–3 |
| $TiO_2$ | 0–1 |
| $CeO_2$ | 0–0.5 |
| $Sb_2O_3$ | 0–1 |
| F | 0–5 | and a particle size of about 0.2–5 mm, in particular 2–3 mm, and a humidity content of ≧5%.

The glass granulate should preferably have a particle size of 2–3 mm. It was found in experiments that a larger or smaller particle size may lead to deterioration of the mechanical properties of the panel. If the particles are too small, cavities and pores develop. If panels having a smooth rear side surface are produced, for which purpose very small temperature gradients are required across the entire volume of the stack, a glass granulate of minimal particle size is preferably used, which ensures a monolithic structure of the panel. No glass fibers may be contained in the glass granulate. The humidity of the glass granulate before the latter is mixed with sand is preferably no less than about 5%.

If dry glass granulate is used, water must be added.

In a preferred embodiment, any type of sand, with no requirement as to purity, with a particle size of < about 1 mm is used as the charge material.

The ratio of glass to sand is preferably about 3:1 to 6:1 weight parts, especially about 4:1. The proportion of sand in the mixture depends on the requirements regarding the rear side of the panel, whereby a minimal sand content is needed for panels having a smooth surface. It depends further on the nature of the decorative surface layer and the parameters of the thermal treatment. It is very important that the mixture is homogenous in its entire volume.

In the process according to the invention, the charge material is selected so that the viscosity η of the glass used is always lower than the viscosity of the charge materials.

This is important with regard to the natural stonetype appearance, thus to the distribution of the glass phase in the construction panel, and also with respect to the strength properties.

Preferably, the charge material is sand having a particle size of less than 1 mm and a moisture content of at least 5% water.

The stacked individual layers are thereby filled into the mold in layer depths of preferably:

- 0–30 mm, in particular 1.5–2 mm for the sand layer (1.1, i.e., the first layer);
- 2–30 mm, in particular 12–15 mm for the mixture layer (1.2, i.e., the middle layer);
- 2–7 mm, in particular 3–5 mm for the glass layer (1.3, i.e., the upper or surface layer).

The base of the mold is covered with, for example, a sand layer of about 2 mm high. This layer is covered by the mixture of glass granulate and sand. The height of this layer is, e.g., 12–15 mm. When manufacturing reinforced panels, a metal reinforcement means such as a wire netting or grating is laid into the center of this layer.

It has also been found that, for certain panel applications, it can be technically advantageous to insert glass and/or ceramic fibers in middle layer 1.2. Care must, however, be taken to ensure that the fibers are not longer than the maximum diameter of the particle size used. Fibers which are too long cause considerable strength losses.

Then the charge is compressed and its surface leveled. The use of vibration tables is advantageous. After compression, the layer of colored glass granulate is deposited, for example, at a thickness of 3 to 5 mm, and the surface is leveled again. The glass granulate mixtures for the decorative surface layer should be standardized for each color shade and produced for storage. A change in the composition of this mixture, e.g., when using crushed glass of unknown origin and chemical composition, necessarily entails an adjustment of the process parameters. The glass granulate for the decorative surface layer can be deposited through different molds or sieves, e.g., to produce specific patterns.

In a preferred embodiment according to the present invention, mica and/or color pigments and/or coloring metal oxides are also mixed into top layer 1.3 of crushed glass in parts of about 0.05–3 wt. %, relative to the total weight of the top layer, to obtain certain decorative effects and color shades. By admixing mica, construction panels are, e.g., produced whose appearance is very similar to that of granite slabs.

According to a particularly preferred modification of the process, the glass of the uppermost individual layer 1.3 is cooled to temperatures which correspond to viscosity values η of about $10^7$–$10^8$ dPas after treatment 1.7 during which the maximum process temperature is achieved. This lower temperature is then maintained for preferably about 5–15 min., in particular 10 min., and subsequently cooled further to preferably about 300°–350° C. as swiftly as technically possible without excessive technical requirements, e.g., by means of cold compressed air.

Optimal results were thereby obtained with panels of 10–12 mm volume. The strength of the surface layer is 5 to 8 times greater than that of ordinary panels.

If micro-cracks developed during the cooling of the surface layer, these can be removed by tempering at a temperature of preferably about 400°–500° C. If required, this tempering may be integrated as an additional technological step into the manufacturing process.

The construction materials produced by the process in accordance with the invention typically display the following values:

| | |
|---|---|
| Density | 2.5–3.0 g/cm$^3$ |
| Bending strength | 10–20 MPa |
| Crushing strength | 200–250 MPa |
| Shock strength | app. 8 kgcm/cm$^2$ |
| Hardness cf. Mohs | 6–7 |
| Moisture absorption | 0.2%–0.8% in 48 hours |
| Thermal expansion coefficient | 90–120 × 10$^{-7}$ × K$^{-1}$ |
| Quenching strength (Temperature difference) | 60 K–120 K |
| Resistance to frost (cycles from +30° C. to –30° C.) | min. 100 |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 43 19 808.2, filed Jun. 15, 1993, are hereby incorporated by reference.

EXAMPLES

The process for manufacturing the decorative, natural stone-type construction materials according to the invention is now described by reference to the following examples:

Example 1

The mold, e.g., measuring 800×600 mm, is cleaned of material residues such as sand, glass and refractory coatings before filling. After cleaning, a thin layer of refractory suspension (kaolimite, $Al_2O_3.2SiO_2.2H_2O$) is applied to the walls and base as a separation aid and the corners are covered with a kaolin paste to prevent subsequent sticking, baking or sintering with the mixture.

The mold is then dried, preferably with infrared emitters.

The mold consists of conventional refractory or heat-resistant material. Cordierite, for example, such as that conventionally used in the ceramics industry as kiln furniture, is advantageously employed.

The mold material must thereby be so selected that sintering ("baking") of the mold with the mixture does not occur at the process temperatures.

The process is to be explained using the example of window glass having the following composition (in wt. %):

| | |
|---|---|
| $SiO_2$ | 71.7 |
| $Al_2O_3$ | 1.85 |
| $Fe_2O_3$ | 0.11 |
| CaO | 6.8 |
| MgO | 4.04 |
| $Na_2O$ | 13.8 |
| $K_2O$ | 1.3 |
| $SO_3$ | 0.4 |

The glass is coarse-crushed by conventional means in a crusher into glass granulate having a grain size of $\geq 2$ and $\leq 3$ mm. The moisture content in accordance with the invention is obtained by admixture of 5% water.

The admixture of water has the additional advantage that dust formation is prevented.

The mold prepared as described above is now filled with sieved sand having a grain size of $\leq 1$ mm and a moisture content of 7% in a layer volume of 1.5 mm. The sand is so distributed that it forms an evenly thick layer on the base of the mold and is simultaneously compressed.

Then a homogenous mixture of 6 parts of the above-specified window-glass with 1 part sand is produced. The bottom sand layer in the mold is covered with this mixture in a layer of 12 mm volume, whereby vibration is continued to obtain a good compression of the layers.

Apart from sand and glass, this central layer may also contain other industrial materials, such as slag, ash, waste materials from fiberglass production and other, in particular porous, inorganic materials.

A layer of pure glass of 3 mm volume is subsequently deposited.

Each layer itself and the entire layer stack are compressed. The mold thus filled is then brought into a continuous electrically heated furnace, and the layer stack is heated to a temperature at which the material sinters, whereby the surface of the layer stack melts to the point of forming a fire-polished, mirror-flush surface.

The continuous furnace must thereby be controllable in such a manner that a very even temperature is generated across the surface of the mold resp. the material to be sintered and that a temperature gradient through the entire volume of the layer stack is ensured.

A continuous furnace having a series of successive connected rectangular chambers forming independent and separately controllable subassemblies which can be separated from each other by spatial screens has proved particularly advantageous.

The layer stack of 16.5 mm volume on the basis of window-glass is heated in the mold at 18K/min. to 750° C. in 40 min. and annealed for 13 min. It is important to ensure that a temperature gradient in the direction of the panel volume is achieved in this temperature range so as to prevent sticking of the base of the panel to the mold at the maximum temperature.

Then further heating with 10° K./min. in 20 min. to 950° C. is carried out and this temperature is maintained for 16 min. The viscosity of the window glass at 950° C. is $10^{4.5}$ dPas.

At this viscosity, the later surface quality of the panel can also be influenced:

If a panel of wavelike surface is to be produced, the mold with the material, starting at this maximum temperature, is brought to such an oscillation that standing waves form on the melted surface.

If the surface of the panel is later to display decorative micro-craters, the evolution of gases from the lower areas is induced at this temperature and the structure thus obtained is subsequently frozen by means of cooling with a rapid increase in viscosity.

The cooling of the product thus sintered and partially molten to 750° C. then commences at a rate of 15K/min. for 13 min., whereby this temperature is then maintained for 27 to 30 min. The cooling must thereby occur in such a manner that an even temperature distribution throughout the entire volume of the stack is obtained.

Then precise linear cooling at a rate of 3K/min. to 420° C. followed by subsequent cooling to room temperature without parameters is performed.

Example 2:

To demonstrate the range of variation and universality of the process according to the invention, a relatively unusual glass composition was selected for this example (wt. %):

| | |
|---|---|
| $SiO_2$ | 70 |
| $Na_2O$ | 16 |
| $Al_2O_3$ | 7 |
| CaO | 2.5 |
| F | 4.5 (!). |

The glass granulate was crushed and a grain size of 2 to 3 mm selected by sieving.

Three layers, a to c, were again deposited in the mold:

a) 1 mm sand, b) 8 mm mixture glass/sand with 4 parts glass to 1 part sand, c) 3 mm pure glass granulate.

The temperature cycle for this glass type ("Marblite"):

| | From (°C.) | To (°C.) | At (°K/min.) | In (min.) | Ret. Pd. (min.) |
|---|---|---|---|---|---|
| (1.5) | room temp. | 650 | 21 | 30 | — |
| (1.6) | 650 | 650–680 | — | — | 10 |
| (1.7) | 680 | 920 | 9 | 27 | 12 |
| (1.8/9) | 920 | 690 | 23 | 10 | 20 |
| (1.9) | 690 | 450 | 4 | 60 | — |
| | 450 | Room temperature with no qualification | | | |

Ret. Pd. = retention period

The examples provide very durable natural stone-type construction and decoration materials with a very long useful life. They can be used to face external and interior walls in industrial, residential and transport infrastructure properties, for furniture and for decorative works of art. The material is produced from sand and glass. It is characterized by high strength and solidity. It is hygienic, easy to clean, highly temperature-resilient and electrically non-conductive.

The facing material according to the invention is a three-layered panel material. The lower layer is preferably mainly sintered sand. The central layer is partly molten by means of respective thermal treatment, so that a partially crystalline, glass-type material is obtained. The upper, decorative layer is preferably made of crushed glass with optionally other additives (colored metal oxides). This layer is fire-polished in the manufacturing process. With regard to its physical, chemical and mechanical properties, the construction and decoration material according to the invention is superior to natural and expensive materials such as granite, marble or travertine.

The panels according to the invention are fastened, e.g., by a mounting system such as that presented in the EP 0 411 442 or by other currently used and commercially available arrangements.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for manufacturing a natural stone-type panel-shaped construction and decoration material of high strength for facing facades, walls and floors in indoor and out-door areas comprising stacked individual layers of broken glass, charge materials and mixtures thereof, said process comprising:

1.1 optionally depositing a level, evenly thick layer of sand in at least one temperature-resistant mold;

1.2 deposition of a level, evenly thick layer of a mixture of crushed glass and sand, on top of said layer of sand if the latter is present;

1.3 super-deposition of a further level layer of crushed glass;

1.4 whereby each individual layer is compressed and the entire layer stack is compressed;

1.5 subsequently heating said layer stack in said at least one mold to a temperature of 600°–850° C. during a period of 20–100 min.;

1.6 tempering said layer stack at 600°–850° C. for a period of 6–35 min.;

1.7 subsequently further heating said layer stack to a temperature at which a viscosity $\eta$ of $10^4$ to $10^{5.5}$ dPas is achieved for said layer of crushed glass and maintaining this temperature for 6–40 min., whereby the temperature application occurs unilaterally from above by a heat flow evenly distributed across the panel surface;

1.8 cooling said layer stack to a temperature of 600°–750° C. over a period of time sufficient to obtain an even temperature distribution through the volume of the layer stack; and 1.9 maintaining said temperature of 600°–750° C. for 15–65 min., followed by precise linear cooling to a temperature of 400°–500° C. at 2–5K/min. and, upon reaching this temperature, performing free or forced cooling to room temperature, wherein said crushed glass has a particle size of >0.5 mm.

2. A process according to claim 1, wherein said crushed glass is granulated glass having a composition of (in weight % on an oxide basis):

| | |
|---|---|
| $SiO_2$ | 60–80 |
| $Al_2O_3$ | 0–7 |
| $Na_2O$ | 2–17 |
| $K_2O$ | 0–7 |
| MgO | 0–4.5 |
| CaO | 0–10 |
| PbO | 0–20 |
| BaO | 0–13.5 |
| $B_2O_3$ | 0–15.0 |
| SrO | 0–1.5 |
| ZnO | 0–1 |
| $ZrO_2$ | 0–3 |
| $TiO_2$ | 0–1 |
| $CeO_2$ | 0–0.5 |
| $Sb_2O_3$ | 0–1 |
| F | 0–5 | and a particle size of >0.5–5 mm, and said crushed glass further exhibits a moisture content of $\geq 5\%$ water.

3. A process according to claim 2, wherein said glass is granulated plate glass, granulated blown glass or mixtures thereof.

4. A process according to claim 1, wherein the particle size of said crushed glass is 2–3 mm.

5. A process according to claim 1, wherein the charge material is sand having a particle size of less than 1 mm and a moisture content of at least 5% water.

6. A process according to claim 1, wherein said mixture of glass and sand contains 3–6 weight-parts glass to 1 weight-part sand.

7. A process according to claim 1, wherein
said sand layer has a thickness of 0–3 mm;
said layer of a mixture of glass and sand has a thickness of 2–30 mm; and
said glass layer has a thickness of 2–7 mm.

8. A process according to claim 7, wherein
said sand layer has a thickness of 1.5–2 mm;
said layer of a mixture of glass and sand has a thickness of 12–15 mm; and
said glass layer has a thickness of 3–5 mm.

9. A process according to claim 1, wherein after heating in 1.7, said layer stack is cooled to a temperature at which the viscosity η of said upper glass layer is $10^7$–$10^8$ dPas, said temperature corresponding to this viscosity being maintained for 5–15 min., and then said layer stack is subsequently cooled to 350°–300° C.

10. A process according to claim 1, wherein the particle size of said crushed glass is at least 0.6 mm.

11. A process according to claim 10, wherein the particle size of said crushed glass is >0.6–5 mm.

12. A process according to claim 1, wherein the particle size of said crushed glass is at least 2 mm.

13. A process according to claim 12, wherein the particle size of said crushed glass is 2–5 mm.

14. A process for manufacturing a natural stone-type panel-shaped construction and decoration material of high strength for facing facades, walls and floors in indoor and outdoor areas comprising stacked individual layers of broken glass, charge materials and mixtures thereof, said process comprising:

1.1 optionally depositing a level, evenly thick layer of sand in at least one temperature-resistant mold;

1.2 deposition of a level, evenly thick layer of a mixture of crushed glass and sand on top of said layer of sand if the latter is present;

1.3 super-deposition of a further level layer of crushed glass;

1.4 whereby each individual layer is compressed and the entire layer stack is compressed;

1.5 subsequently heating said layer stack in said at least one mold to a temperature of 600°–850° C. during a period of 20–100 min.;

1.6 tempering said layer stack at 600°–850° C. for a period of 6–35 min.;

1.7 subsequently further heating said layer stack to a temperature at which a viscosity η of $10^4$ to $10^{5.5}$ dPas is achieved for said layer of crushed glass and maintaining this temperature for 6–40 min., whereby the temperature application occurs unilaterally from above by a heat flow evenly distributed across the panel surface;

1.8 cooling said layer stack to a temperature of 600°–750° C. over a period of time sufficient to obtain an even temperature distribution through the volume of the layer stack; and 1.9 maintaining said temperature of 600°–750° C. for 15–65 min., followed by precise linear cooling to a temperature of 400°–500° C. at 2–5K/min. and, upon reaching this temperature, performing free or forced cooling to room temperature, wherein a metal reinforcement means is inserted in said layer of a glass and sand mixture.

15. A process according to claim 14, wherein said metal reinforcement means is a grating or wire netting.

16. A process for manufacturing a natural stone-type panel-shaped construction and decoration material of high strength for facing facades, walls and floors in indoor and outdoor areas comprising stacked individual layers of broken glass, charge materials and mixtures thereof, said process comprising:

1.1 optionally depositing a level, evenly thick layer of sand in at least one temperature-resistant mold;

1.2 deposition of a level, evenly thick layer of a mixture of crushed glass and sand on top of said layer of sand if the latter is present;

1.3 super-deposition of a further level layer of crushed glass;

1.4 whereby each individual layer is compressed and the entire layer stack is compressed;

1.5 subsequently heating said layer stack in said at least one mold to a temperature of 600°–850° C. during a period of 20–100 min.;

1.6 tempering said layer stack at 600°–850° C. for a period of 6–35 min.;

1.7 subsequently further heating said layer stack to a temperature at which a viscosity η of $10^4$ to $10^{5.5}$ dPas is achieved for said layer of crushed glass and maintaining this temperature for 6–40 min., whereby the temperature application occurs unilaterally from above by a heat flow evenly distributed across the panel surface;

1.8 cooling said layer stack to a temperature of 600°–750° C. over a period of time sufficient to obtain an even temperature distribution through the volume of the layer stack; and 1.9 maintaining said temperature of 600°–750° C. for 15–65 min., followed by precise linear cooling to a temperature of 400°–500° C. at 2–5K/min. and, upon reaching this temperature, performing free or forced cooling to room temperature, wherein mica, at least one color pigment, at least one metal oxide or mixtures thereof, are admixed in said upper layer of crushed glass in an amount of 0.05–3%.

17. A process for manufacturing a natural stone-type panel-shaped construction and decoration material of high strength for facing facades, walls and floors in indoor and outdoor areas comprising stacked individual layers of broken glass, charge materials and mixtures thereof, said process comprising:

1.1 optionally depositing a level, evenly thick layer of sand in at least one temperature-resistant mold;

1.2 deposition of a level, evenly thick layer of a mixture of crushed glass and sand on top of said layer of sand if the latter is present;

1.3 super-deposition of a further level layer of crushed glass;

1.4 whereby each individual layer is compressed and the entire layer stack is compressed;

1.5 subsequently heating said layer stack in said at least one mold to a temperature of 600°–850° C. during a period of 20–100 min.;

1.6 tempering said layer stack at 600°–850° C. for a period of 6–35 min.;

1.7 subsequently further heating said layer stack to a temperature at which a viscosity η of $10^4$ to $10^{5.5}$ dPas is achieved for said layer of crushed glass and maintaining this temperature for 6–40 min., whereby the temperature application occurs unilaterally from above by a heat flow evenly distributed across the panel surface;

1.8 cooling said layer stack to a temperature of 600°–750° C. over a period of time sufficient to obtain an even temperature distribution through the volume of the layer stack; and 1.9 maintaining said temperature of 600°–750° C. for 15–65 min., followed by precise linear cooling to a temperature of 400°–500° C. at 2–5K/min. and, upon reaching this temperature, performing free or forced cooling to room temperature, wherein said mixture of glass and sand contains 4–6 wt. parts glass to 1 wt. part sand.

18. A process according to claim 17, wherein said mixture of glass and sand contains 4 weight-parts glass to 1 weight-part sand.

19. A process for manufacturing a natural stone-type panel-shaped construction and decoration material of high strength for facing facades, walls and floors in indoor and outdoor areas comprising stacked individual layers of broken glass, charge materials and mixtures thereof, said process comprising:

heating a layer stack containing a layer of crushed glass on top of a layer of a mixture of crushed glass and sand which optionally is on top of a layer of sand, wherein said layer stack is heated to a tempering temperature and thereafter held at said temperature for a time sufficient to perform tempering;

subsequently heating said layer stack to a temperature sufficient to achieve a viscosity of $10^4$–$10^{5.5}$ dPas for said layer of crushed glass and maintaining said temperature to achieve an even surface;

cooling said layer stack to a temperature and during a time period sufficient to obtain an even temperature distribution through the entire volume of said layer stack; and thereafter cooling said layer stack to room temperature at a rate whereby cracks and deformations in said layer stack are avoided.

20. A process according to claim 19, wherein the particle size of said crushed glass is at least 0.6 mm.

21. A process according to claim 19, wherein the particle size of said crushed glass is at least 2 mm.

22. A process according to claim 21, wherein the particle size of said crushed glass is 2–5 mm.

23. A process according to claim 19, wherein said mixture of glass and sand contains 4–6 wt. parts glass to 1 wt. part sand.

24. A process according to claim 19, wherein a metal reinforcement means is inserted in said layer of a glass and sand mixture.

25. A process according to claim 19, wherein mica, at least one color pigment, at least one metal oxide or mixtures thereof, are admixed in said upper layer of crushed glass in an amount of 0.05–3%.

26. A process for manufacturing a natural stone-type panel-shaped construction and decoration material of high strength for facing facades, walls and floors in indoor and outdoor areas comprising stacked individual layers of broken glass, charge materials and mixtures thereof, said process comprising:

1.1 optionally depositing a level, evenly thick layer of sand in at least one temperature-resistant mold;

1.2 deposition of a level, evenly thick layer of a mixture of crushed glass and sand on top of said layer of sand if the latter is present;

1.3 super-deposition of a further level layer of crushed glass;

1.4 whereby each individual layer is compressed and the entire layer stack is compressed;

1.5 subsequently heating said layer stack in said at least one mold to a temperature of 600°–850° C. during a period of 20–100 min.;

1.6 tempering said layer stack at 600°–850° C. for a period of 6–35 min.;

1.7 subsequently further heating said layer stack to a temperature at which a viscosity η of $10^4$ to $10^{5.5}$ dPas is achieved for said layer of crushed glass and maintaining this temperature for 6–40 min., whereby the temperature application occurs unilaterally from above by a heat flow evenly distributed across the panel surface;

1.8 cooling said layer stack to a temperature of 600°–750° C. over a period of time sufficient to obtain an even temperature distribution through the volume of the layer stack; and 1.9 maintaining said temperature of 600°–750° C. for 15–65 min., followed by precise linear cooling to a temperature of 400°–500° C. at 2–5K/min. and, upon reaching this temperature, performing free or forced cooling to room temperature.

* * * * *